(12) United States Patent
Jibu et al.

(10) Patent No.: US 9,575,827 B2
(45) Date of Patent: Feb. 21, 2017

(54) MEMORY MANAGEMENT PROGRAM, MEMORY MANAGEMENT METHOD, AND MEMORY MANAGEMENT DEVICE

(71) Applicant: FUJITSU LIMITED, Kawasaki-shi, Kanagawa (JP)

(72) Inventors: Masayuki Jibu, Kawasaki (JP); Kentaro Nishihara, Kawasaki (JP); Yuki Hasegawa, Kawasaki (JP); Kazuya Watanabe, Kawasaki (JP); Kazuhide Imaeda, Kawasaki (JP); Hiroyuki Yamamoto, Kawasaki (JP); Yasutoshi Suzuki, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 14/530,890

(22) Filed: Nov. 3, 2014

(65) Prior Publication Data
US 2015/0186059 A1    Jul. 2, 2015

(30) Foreign Application Priority Data
Dec. 27, 2013   (JP) .................................. 2013-273051

(51) Int. Cl.
G06F 12/00     (2006.01)
G06F 11/07     (2006.01)
G06F 12/08     (2016.01)

(52) U.S. Cl.
CPC ......... *G06F 11/0778* (2013.01); *G06F 11/073* (2013.01); *G06F 12/08* (2013.01); *G06F 2212/1044* (2013.01)

(58) Field of Classification Search
CPC .............. G06F 11/1456; G06F 11/2074; G06F 11/2071
See application file for complete search history.

(56) References Cited

U.S. PATENT DOCUMENTS

| | | | |
|---|---|---|---|
| 2002/0049883 A1* | 4/2002 | Schneider | G06F 21/80 711/100 |
| 2005/0240813 A1 | 10/2005 | Okada et al. | |
| 2006/0085792 A1* | 4/2006 | Traut | G06F 11/1438 718/100 |
| 2006/0136641 A1* | 6/2006 | Takemori | G06F 9/4812 710/260 |
| 2009/0113153 A1 | 4/2009 | Yamamoto et al. | |
| 2010/0070726 A1* | 3/2010 | Ngo | G06F 11/1464 711/162 |

(Continued)

FOREIGN PATENT DOCUMENTS

| | | |
|---|---|---|
| JP | 62-000509 | 1/1987 |
| JP | 63-168742 | 7/1988 |

(Continued)

*Primary Examiner* — Adam M Queler
*Assistant Examiner* — Trang Ta
(74) *Attorney, Agent, or Firm* — Fujitsu Patent Center

(57) ABSTRACT

A non-transitory computer-readable recording medium stores a memory management program that causes a computer to execute a process. The process includes detecting writing into a memory; and saving, in association with each other in a predetermined storage area, data before the writing which is stored in a data area of a write destination of the detected writing, and context information of a processor at a time of detecting the writing into the memory.

14 Claims, 16 Drawing Sheets

(56) References Cited

U.S. PATENT DOCUMENTS

| | | | | |
|---|---|---|---|---|
| 2010/0185804 A1* | 7/2010 | Omizo | ............... | G06F 12/0246 |
| | | | | 711/103 |
| 2010/0318746 A1* | 12/2010 | Troxel | ............... | G06F 11/1438 |
| | | | | 711/141 |
| 2012/0102370 A1* | 4/2012 | Yoshida | .............. | G06F 11/0778 |
| | | | | 714/48 |
| 2012/0266018 A1* | 10/2012 | Tanaka | ............... | G06F 11/2097 |
| | | | | 714/19 |
| 2013/0246724 A1* | 9/2013 | Furuya | ................. | G06F 3/0655 |
| | | | | 711/162 |

FOREIGN PATENT DOCUMENTS

| | | |
|---|---|---|
| JP | 2005-301497 | 10/2005 |
| JP | 2009-146381 | 7/2009 |
| JP | 2009-245216 | 10/2009 |

\* cited by examiner

FIG.4

| DIFFERENCE MEMORY AREA NUMBER | ADDRESS OF SAVE DESTINATION | PAGE OUT AREA USAGE LOCATION INFORMATION 1 | PAGE OUT AREA USAGE LOCATION INFORMATION 2 | ... | PAGE OUT AREA USAGE LOCATION INFORMATION n |
|---|---|---|---|---|---|
| 1 | 0x10003000 | AREA 3, 0x1000f000 | AREA 4, 0x20000000 | ... | AREA m, 0x40000000 |
| 2 | 0x0000f000 | — | — | ... | — |
| 3 | 0x10006000 | AREA 5, 0x30000000 | — | ... | — |

FIG.5

| ADDRESS OF MEMORY AREA | CHANGE FLAG | ADDRESS OF SAVE DESTINATION |
|---|---|---|
| 0x00000000 | 1 | 0x10003000 |
| 0x00001000 | 1 | 0x0000f000 |
| 0x00002000 | 1 | 0x10006000 |
| 0x00003000 | 0 | 0xffffffff |
| 0x00004000 | 1 | 0x30000000 |
| ... | ... | ... |

FIG.6

| SETTING ITEM (PLURAL ITEMS MAY BE SELECTED) | PARAMETER (MAY BE CHANGED) |
|---|---|
| TIME | ACQUIRE EVERY 10 SECONDS |
| MEMORY CHANGE AMOUNT | ACQUIRE EVERY TIME 1000 PAGES ARE CHANGED |
| CPU USAGE RATIO | ACQUIRE WHEN USAGE RATIO IS GREATER THAN OR EQUAL TO 50% |
| DISK USAGE AMOUNT | ACQUIRE WHEN GREATER THAN OR EQUAL TO 1000 IOPS |
| NETWORK USAGE AMOUNT | ACQUIRE WHEN GREATER THAN OR EQUAL TO 500 Mbps |

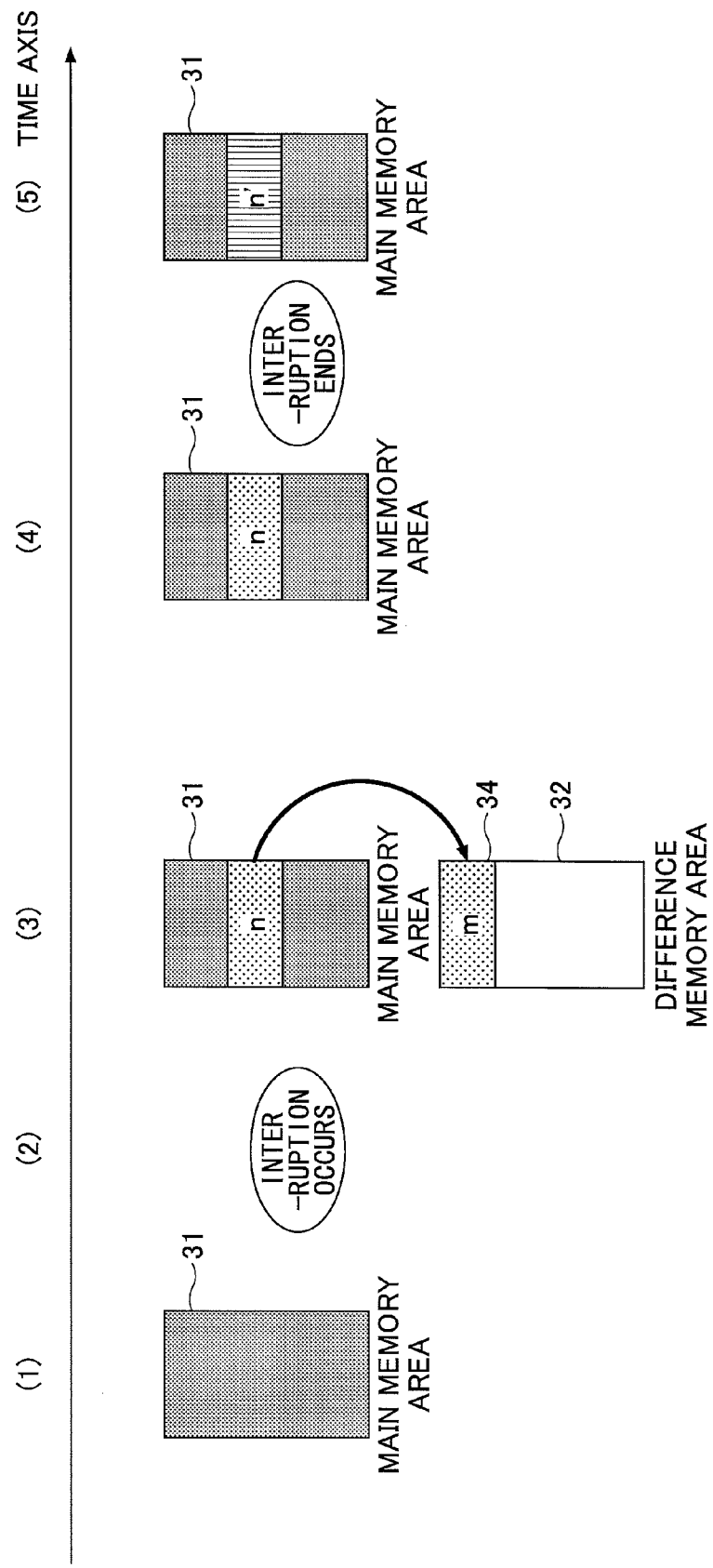

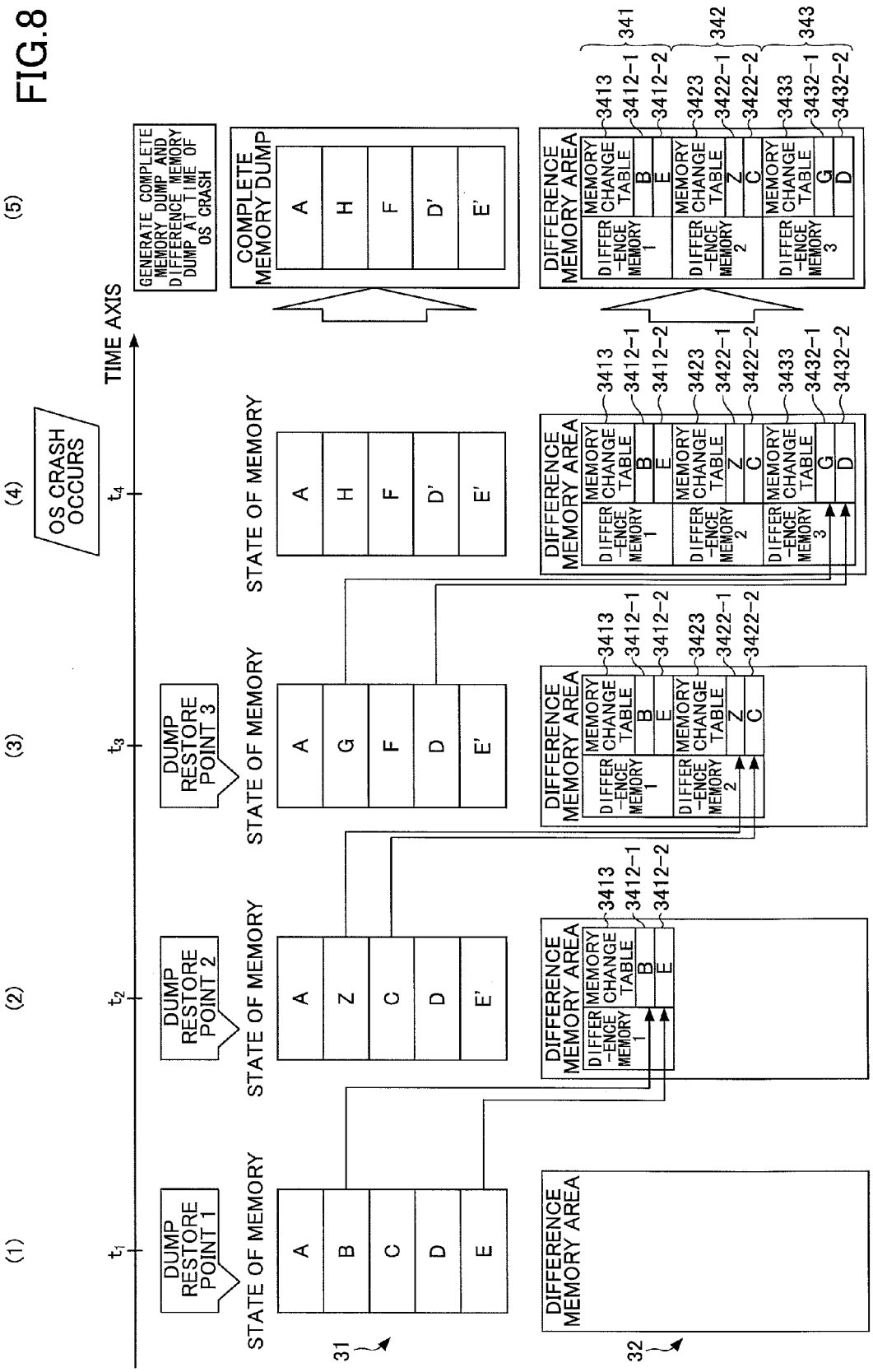

FIG.12

| SETTING ITEM (PLURAL ITEMS MAY BE SELECTED) | PARAMETER (MAY BE CHANGED) |
|---|---|
| DELETE OLD MEMORY DATA SAVED FOR MORE THAN CERTAIN AMOUNT OF TIME FROM PRESENT TIME | 1 HOUR |
| DELETE DIFFERENCE MEMORY DATA BY EVERY SEVERAL DATA ITEMS (THIN OUT) | EVERY TWO TIME POINTS |
| DELETE DATA EXCEPT FOR DIFFERENCE MEMORY DATA, WHEN CPU CONTEXT INCLUDES PARTICULAR INSTRUCTION OR ADDRESS | PARTICULAR INSTRUCTION, ADDRESS |

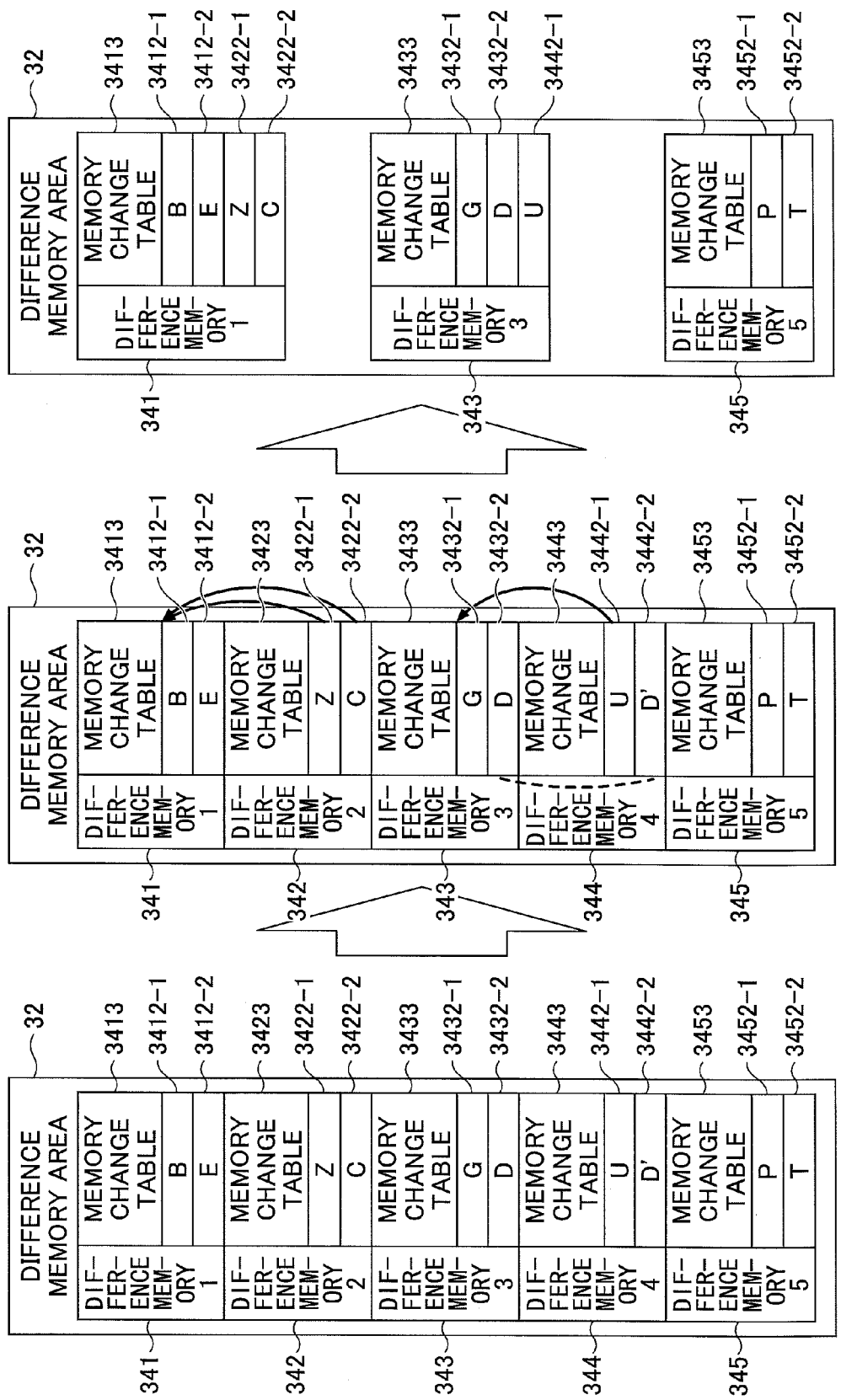

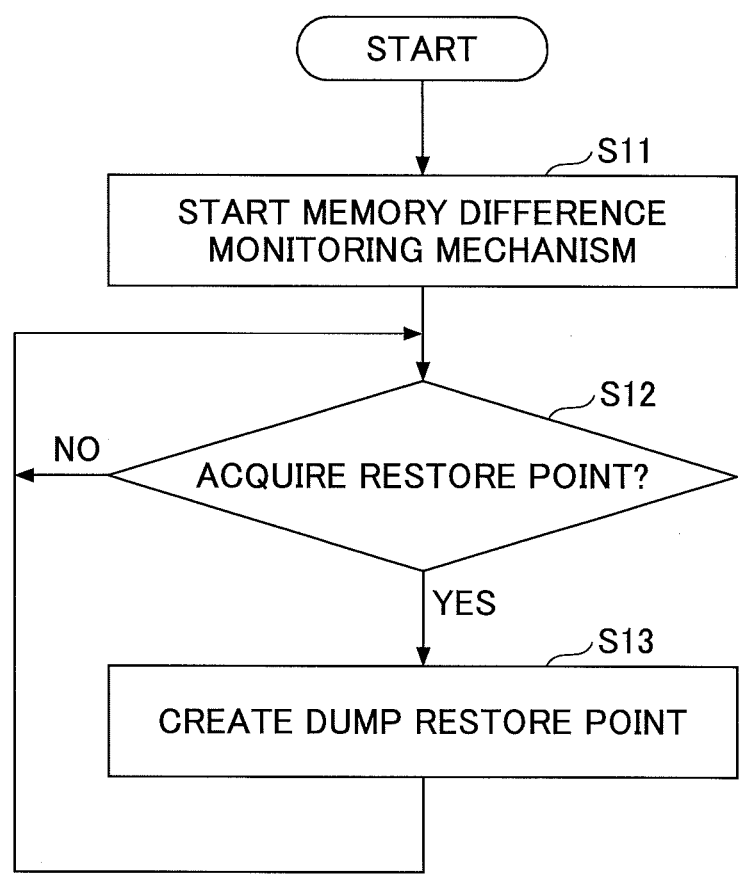

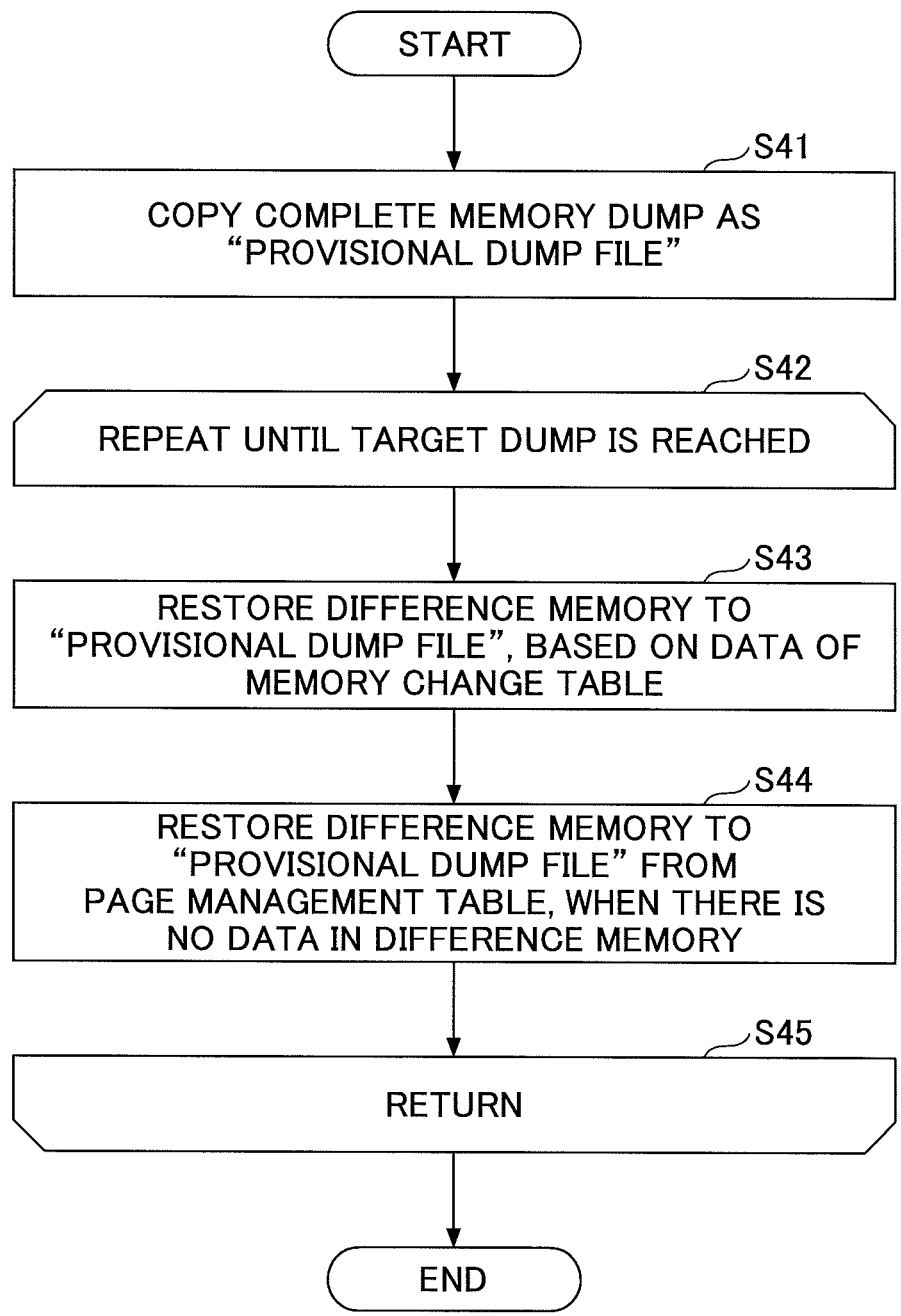

MEMORY MANAGEMENT PROGRAM, MEMORY MANAGEMENT METHOD, AND MEMORY MANAGEMENT DEVICE

CROSS-REFERENCE TO RELATED APPLICATION

This patent application is based upon and claims the benefit of priority of the prior Japanese Patent Application No. 2013-273051 filed on Dec. 27, 2013, the entire contents of which are incorporated herein by reference.

FIELD

The embodiments discussed herein are related to a memory management program, a memory management method, and a memory management device.

BACKGROUND

Conventionally, there is an information processing device in which a virtual machine monitor sets all pages in a page table corresponding to a memory area to be assigned to a guest OS, to a write inhibit state, and in response to an exception of page write violation, the data before update of a page in which the page write violation has occurred is saved in a memory area managed by the virtual machine monitor.

After saving the data before update, the virtual machine monitor releases the write inhibit of the page in which the page write violation has occurred, such that the guest OS may continue to write into the page in which the page write violation has occurred. Every time a check point is acquired, the virtual machine monitor resets all pages of the page table corresponding to a memory area to be assigned to a guest OS to a write inhibit state (see, for example Patent Document 1).

Furthermore, there is a method in which the memory information used when the program is executed is collected and saved according to the passage of time, and all memory information is restored at an arbitrary time point afterward (see, for example Patent Document 2 or 3).

Patent Document 1: Japanese Laid-Open Patent Publication No. 2009-245216
Patent Document 2: Japanese Laid-Open Patent Publication No. S62-000509
Patent Document 3: Japanese Laid-Open Patent Publication No. 2009-146381

However, in a conventional information processing device, when acquiring CPU (Central Processing Unit) context information, the process of acquiring context information needs to include the process of saving the context information and setting the CPU to a regular operation state, and therefore the process of acquiring the context information has been time-consuming.

Furthermore, it has not been possible to associate the memory data with the context information of the CPU, and therefore when the computer system stops due to a failure, it has not been possible to recognize the operation status of the CPU from the context information and check the cause of the failure by tracing back to the past.

SUMMARY

According to an aspect of the embodiments, a non-transitory computer-readable recording medium stores a memory management program that causes a computer to execute a process. The process includes detecting an operation of writing into a memory; and saving, in association with each other in a predetermined storage area, data before the writing which is stored in a data area of a write destination of the detected writing, and context information of a processor at a time of detecting the writing into the memory.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 4 illustrates a page management table;
FIG. 5 illustrates a memory change table;
FIG. 6 illustrates setting a method of acquiring a difference memory;
FIG. 7 illustrates the trapping of writing and the saving of memory data;
FIG. 8 illustrates securing the difference memory and saving memory data;
FIG. 12 illustrates setting a method of deleting the difference memory;
FIG. 13 illustrates deleting the difference memory;
FIG. 14 is a flowchart of a memory management operation;
FIG. 17 is a flowchart of restoring a memory dump.

DESCRIPTION OF EMBODIMENTS

Preferred embodiments of the present invention will be explained with reference to accompanying drawings.

Figure 1:
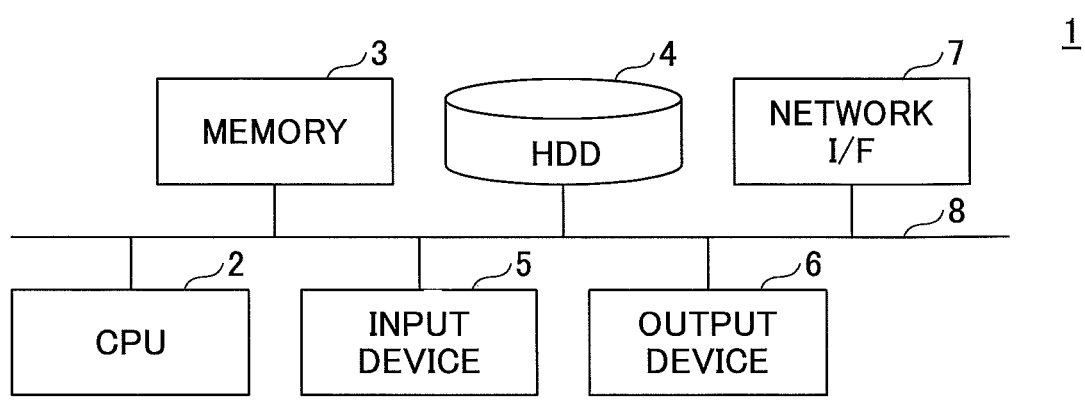
FIG. 1 illustrates a hardware configuration of a memory management device.

FIG. 1 illustrates an example of a hardware configuration of a memory management device according to the present embodiment.

In FIG. 1, a memory management device 1 includes a CPU (Central Processing Unit) 2, a memory 3, a HDD (Hard Disk Drive) 4, an input device 5, an output device 6, and a network I/F (Interface) 7. The CPU 2, the memory 3, the HDD 4, the input device 5, the output device 6, and the network I/F 7 are interconnected by a system bus 8.

The CPU 2 is a central processing unit that loads programs and data stored in the HDD 4 into the memory 3 and executes processes according to the programs. For example, the CPU 2 is a multicore processor having a plurality of processor cores. A multicore processor is able to perform inter-processor communication between a plurality of processors.

The memory 3 is a main storage unit of the memory management device 1, and is constituted by, for example, a RAM (Random Access Memory). The programs stored in the memory 3 are executed by the CPU 2. The memory 3 may include, for example, a ROM (Read-Only Memory) and a flash memory.

The HDD 4 is a secondary storage unit of the memory management device 1. The HDD 4 stores programs and data, which are loaded in the memory 3 according to need. Furthermore, when there are not enough addresses in the main memory area secured in the memory 3, a paging process is performed to temporarily back-up the data of the memory 3 in the HDD 4. In the present embodiment, the HDD 4 is given as an example of the secondary storage unit; however, instead of the HDD 4, for example, a SSD (Solid State Drive) may be used.

The input device 5 is a device for inputting data from the outside of the memory management device 1 to the inside of the memory management device 1. The input device 5 includes, for example, a keyboard, a mouse, and a touch panel. The output device 6 is a device for outputting the data inside the memory management device 1 to the outside of the memory management device 1. The output device 6 includes, for example, a display and a speaker.

The network I/F 7 controls the communication with an external device via a network. The network I/F 7 includes a NIC (Network Interface Controller) corresponding to the protocol of the network to which the memory management device 1 is connected.

Figure 2:
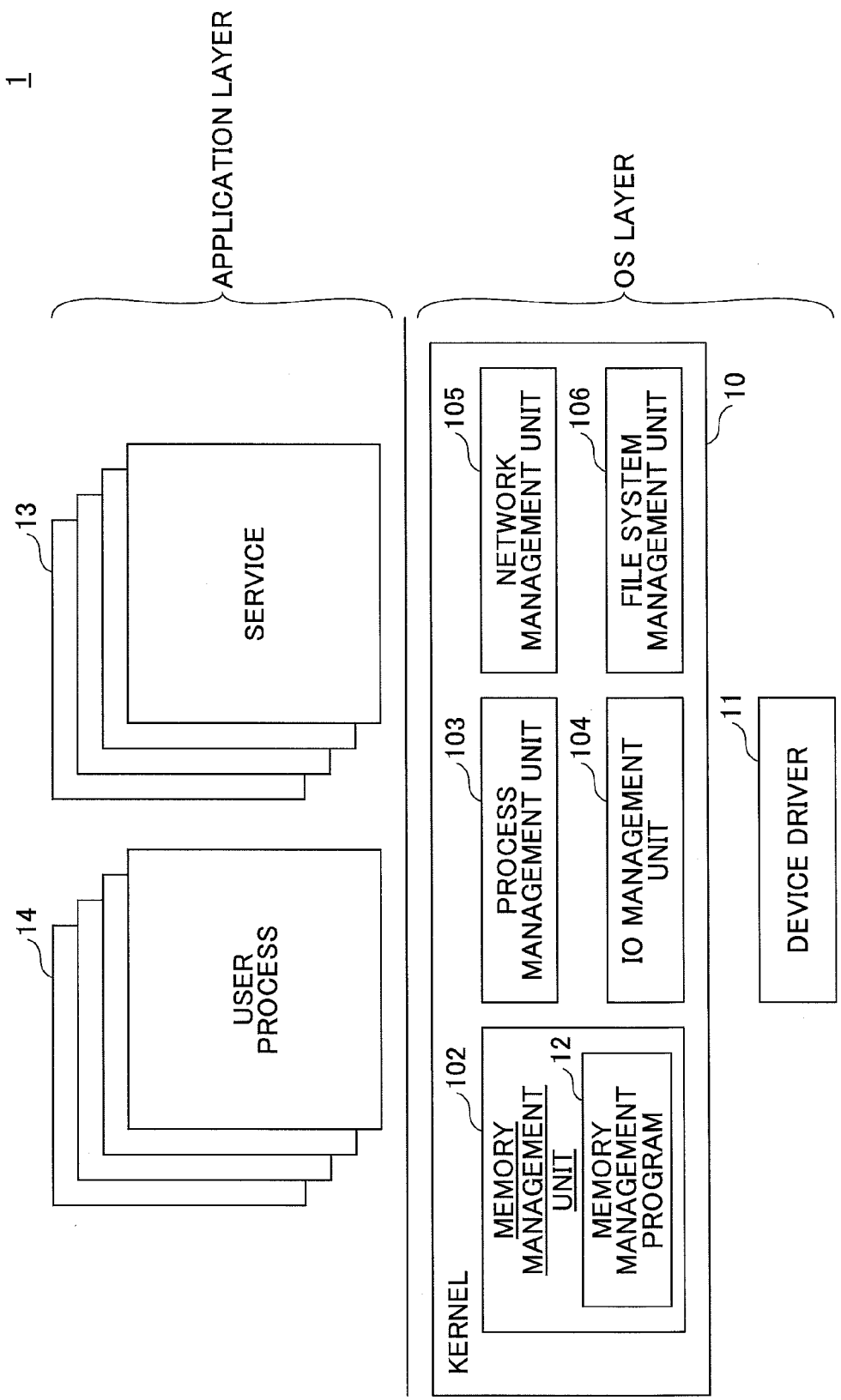
FIG. 2 illustrates a software configuration of the memory management device.

Next, a description is given of a software configuration of the memory management device 1 according to the present embodiment, with reference to FIG. 2. FIG. 2 illustrates an example of a software configuration of the memory management device 1. The software described with reference to FIG. 2 is loaded into the memory 3 and executed by the CPU 2, which are described with reference to FIG. 1.

In FIG. 2, the memory management device 1 includes, as a software configuration, a hierarchical structure including an OS (Operating System) layer, an application layer, and a hardware layer (not illustrated) which is positioned at a lower level than the OS layer. The OS layer includes a kernel 10 and a device driver 11.

The device driver 11 is a program for controlling the hardware in the hardware layer. The device driver 11 includes a plurality of program modules corresponding to the hardware configuration, and each program module may be dynamically added to the kernel 10 according to the hardware configuration.

The application layer includes a plurality of application programs (hereinafter, abbreviated as "applications") that operate on the OS layer. The memory management device 1 includes, as examples of applications, a plurality of services 13 and a plurality of user processes 14. For example, the user processes 14 are executed on the OS, which are programs that provide a function for attaining a purpose defined for a user. Furthermore, the services 13 are programs that provide a service using the OS layer or the hardware layer to the user processes 14 via the services 13.

The kernel 10 has a function of the central core of the OS layer, and includes, for example, a memory management unit 102, a process management unit 103, an IO (Input Output) management unit 104, a network management unit 105, and a file system management unit 106.

The memory management unit 102 performs memory mapping by virtual addressing with respect to the memory 3 that is a physical memory, and implements management such that the respective applications may safely use the mapped memory areas. The process management unit 103 provides an interface for allowing execution with respect to the applications, and for accessing the hardware. For example, the process management unit 103 provides the permission to use hardware in response to a system call from an application. Furthermore, the process management unit 103 provides a stack needed for executing an application.

The IO management unit 104 manages the input and output of data by an input/output device connected to the memory management device 1, via the device driver 11. The network management unit 105 manages a network connected to the memory management device 1. The file system management unit 106 manages the handling of data by the file system.

The memory management unit 102 includes a memory management program 12. The memory management program 12 is a function for providing new functions according to the present embodiment with respect to the memory management unit 102, which is described in detail below with reference to FIG. 3. Note that in the present embodiment, the memory management program 12 is implemented by extending the functions of the memory management unit 102. However, for example, the memory management program 12 may be implemented as the service 13, as a separate program from the memory management unit 102.

Figure 3:
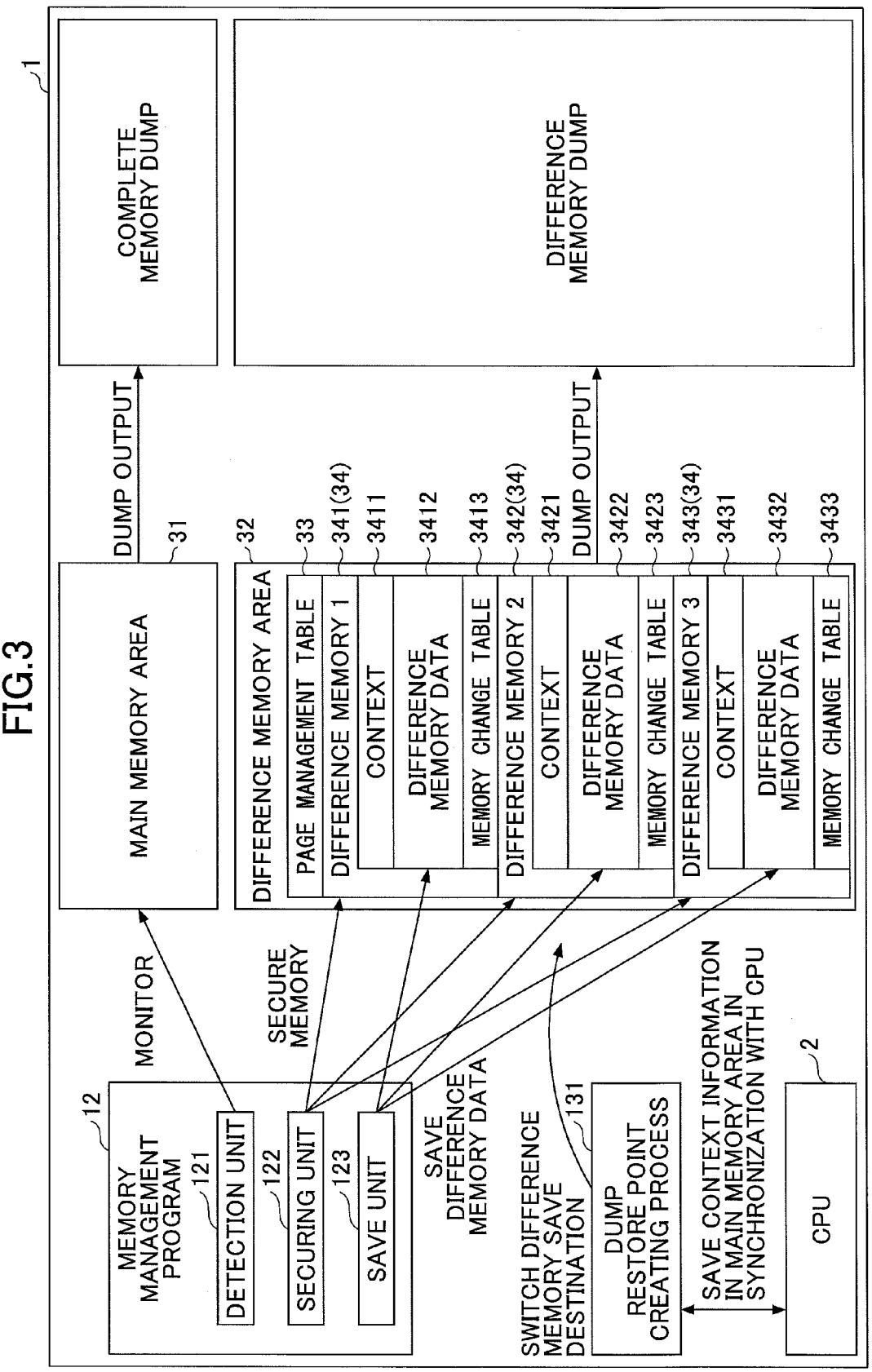
FIG. 3 schematically illustrates functions of the memory management device.

Next, functions of the memory management device 1 are described with reference to FIG. 3. FIG. 3 schematically illustrates examples of functions of the memory management device 1.

In FIG. 3, in the memory management device 1, the memory management program 12 described with reference to FIG. 2 and programs of a dump restore point creation process (hereinafter, abbreviated as "restore process") 131 are operated. The memory management program 12 includes a detection unit 121, a securing unit 122, and a save unit 123. The restore process 131 is implemented as a service 13 operating on the OS layer. However, for example, the restore process 131 may be implemented by extending the function of the kernel 10.

The memory management device 1 includes a main memory area 31 and a difference memory area 32, in a virtual address space mapped in the memory 3 by the memory management unit 102. The main memory area 31 is an area used by the kernel 10 in executing programs.

The difference memory area 32 includes a page management table 33 and a difference memory 34 (341, 342, 343). The page management table 33 is a table for managing the change in the difference memory data at the time of page out described below. The difference memory 34 includes a context, difference memory data, and a memory change table. The difference memory area 32 may include a plurality of difference memories 34. As examples of the difference memories 34 illustrated in FIG. 3, a difference memory 1 (341), a difference memory 2 (342), and a difference memory 3 (343) are saved. Each predetermined difference memory 34$n$ includes a context 34$n$1, difference memory data 34$n$2, and a memory change table 34$n$3, which are saved in association with each other. For example, in the difference memory 1 (341), a context 3411, difference memory data 3412, and a memory change table 3413 are saved in association with each other.

The detection unit 121 monitors the main memory area 31 and detects the writing into the main memory area 31. For example, the detection unit 121 may trap a writing process of changing the data in the memory performed by the memory management unit 102 and detect the writing into the main memory area 31. By trapping the writing process, the detection unit 121 is able to detect the writing into the main memory area 31 in units of pages. Furthermore, the detection unit 121 may detect the writing into the memory by detecting a paging process.

The paging process is, for example, for performing a page fault process arising when one of the user processes 14 accesses a page in a virtual address space that is not mapped as a physical memory. The memory management unit 102 erases a needless page from the physical memory by writing the page in a hard disk (page out), or arranges a needed page in the physical memory by reading the page from the hard disk (page in).

The securing unit 122 sequentially secures, in the difference memory area 32, storage areas of the difference memory 34 at predetermined timings. FIG. 3 illustrates that three difference memories, the difference memory 1 (341) through the difference memory 3 (343), are secured.

The predetermined timings at which the securing unit 122 secures the difference memory 34 are, for example, when a predetermined time interval passes. Other examples of the predetermined timings are when the change amount of the memory has reached a predetermined amount, the usage ratio of the CPU has become greater than or equal to a predetermined value, the usage amount per unit time of a storage device such as a hard disk has become greater than or equal to a predetermined number of times, and the usage amount per unit time of the network has become greater than or equal to a predetermined value.

The predetermined timings at which the securing unit 122 secures the difference memory 34 may be set in advance. The setting of the predetermined timings is described with reference to FIG. 6. FIG. 6 illustrates an example of setting a method of acquiring a difference memory 34.

In FIG. 6, "setting item" and "parameter" express the timings of securing the difference memory 34. The user may specify the setting item and parameter. When the setting item satisfies the condition specified by the parameter, the difference memory 34 is secured. For example, when a setting item "time" is selected, and the parameter is "acquire every 10 seconds", the difference memory 34 is sequentially secured every 10 seconds.

A plurality of setting items may be selected. When a plurality of setting items are selected, when any one of the setting items satisfies the condition specified by the parameter, the difference memory 34 is secured. Furthermore, the parameter may be changed according to need.

To specify the setting items and the parameters of FIG. 6, for example, the memory management program 12 provides a UI (User Interface) of a setting screen illustrated in FIG. 6, by a display of the output device 6. Furthermore, texts describing the setting items may be saved in advance as a setting file, and the setting file may be read when the memory management program 12 is activated. The securing unit 122 may set or change the predetermined timing of securing the difference memory 34 according to a set condition.

The save unit 123 sequentially saves, as memory dumps, in the storage area of the difference memory 34 secured by the securing unit 122, the difference memory data stored in the data area that is the write destination detected by the detection unit 121. A memory dump is obtained by writing the data stored in the memory. The difference memory data saved by the save unit 123 may be saved, for example, in units of pages of the main memory area 31. Furthermore, a plurality of pages may be saved as a single item of difference memory data.

The restore process 131 sequentially saves the context information of the CPU 2 in the respective difference memories 34, in accordance with the securing of the difference memory 34.

The context information is setting information indicating the usage status of the CPU 2, which is saved when the CPU 2 is shared by a plurality of processes and a context switch occurs. The difference memory data saved in the difference memory 34 is saved together with corresponding context information, such that the past difference memory data is consistent with the state of the CPU 2 at the same past time.

In the above example, being consistent means that the data of the memory at a past time point before the crash occurs, and the state of the CPU 2 at the same past time point, are associated with each other in terms of time series.

The memory data of the main memory area 31 and the memory data of the difference memory area 32 are respectively saved as a complete memory dump and a difference memory dump, when the CPU 2 stops due to an error. For example, the saved complete memory dump and difference memory dump may be read when the CPU 2 is rebooted, for the purpose of analyzing the error. By the saved complete memory dump and difference memory dump that have been read, it is possible to restore the past memory dump before the CPU 2 stops due to an error. The restoring of the memory dump is described in detail below.

Next, details of the page management table 33 are described with reference to FIG. 4. The page management table 33 is a table for managing changes in the difference memory data at the time of page out. FIG. 4 illustrates an example of the page management table 33.

In FIG. 4, the page management table 33 includes respective fields of a difference memory area number, an address of a save destination, and page out area usage location information (1 through n). The difference memory area number is information indicating the number of the difference memory in which the information of the main memory area that has been subjected to page out is saved. As the difference memory area number, an integer of 1 through n is input.

The address of a save destination is the start address of the difference memory area 34n saving the information of the main memory area 31 before a change is made in the main memory area 31, which is saved when data is written in the main memory area 31 and the change is made in the main memory area 31. Note that when the main memory area 31 is not changed, (0xffffffff) is input. By providing the page management table 33, it is possible to manage the difference memories 34 that increase and decrease, in an integrated manner.

The page out area usage location information (1 through n) is information that is added when the information of the main memory area 31 that has been subjected to page out and the information of the past difference memory area match. The page out area usage location information is saved by associating the difference memory 34 and the address of the main memory area 31. In the page out area usage location information, with respect to one difference memory 34, it is possible to save a plurality of difference memory data items. For example, in FIG. 4, in the area where the difference memory area number is 1, an m number of difference memory data items are saved. Meanwhile, in the area where the difference memory area number is 2, one difference memory data item is saved, and in the area where the difference memory area number is 3, two difference memory data items are saved.

Next, details of the memory change table 34*n*3 included in each difference memory area 34*n* are described with reference to FIG. 5. FIG. 5 illustrates an example of a memory change table.

In FIG. 5, each memory change table includes fields of the address of the memory area, the change flag, and the address of the save destination. The address of the memory area indicates the leading address when the main memory area 31 is divided in units of pages. The change flag indicates whether a change has been made in the main memory area 31. The change flag "1" means that a change has been made. Furthermore, the change flag "0" means that a change has not been made. The address of the save destination is the leading address of each difference memory area 34*n*. The address of the save destination is the same as the address of the save destination described with reference to FIG. 4, and are also recorded in association with the addresses of the memory areas with respect to the difference memories that are increased and decreased.

Next, with reference to FIG. 7, a description is given of the operation of saving the memory data of the main memory area 31 into the difference memory area 32 performed by the memory management program 12 described with reference to FIG. 3. FIG. 7 illustrates an example of the writing trap and saving the memory data.

In FIG. 7, (1) through (5) indicate an order in the passage of time. In (1), first, the entire main memory area 31 is set to be in a write inhibit state. The halftone dots in the main memory area 31 in (1) indicate that the main memory area 31 is in a write inhibit state. By setting the main memory area 31 in a write inhibit state, the detection unit 121 traps all writing processes with respect to the main memory area 31. In (2), the detection unit 121 causes an interrupt process by trapping a process including writing into the main memory area 31.

In (3), the securing unit 122 secures the difference memory 34 in the difference memory area 32 as a predetermined storage area, and saves the memory data (data n) of the main memory area 31 that is the target of the writing process, as data m in the difference memory 34 in units of pages. Note that the saved data n of the main memory area 31 and the data m saved in the difference memory 34 may be completely the same data. Alternatively, for example, the data m may be obtained by compressing data n, if data n may be restored from data m in a restoring process of the complete memory dump described below.

In (4), the memory area of the saved data n is released from the write inhibit state, and the interrupt process ends. In (5), the trapped writing process is executed, and data n' is written into the main memory area 31 that has been released from the write inhibit state.

Note that the setting of the write inhibit state and the releasing of the write inhibit state of the main memory area 31 may be performed, for example, with respect to the memory management unit 102 by the memory management program 12.

Next, with reference to FIG. 8, a detailed description is given of securing the difference memory 34 and saving the memory data, when the setting item is "time" in the method of acquiring a difference memory described with reference to FIG. 6. FIG. 8 illustrates an example of securing the difference memory 34 and saving memory data.

In FIG. 8, (1) through (3) indicate the state of the memory of the main memory area 31 at the dump restore points 1 through 3 at times t1 through t3. At time t1, the state of the memory indicates that memory data "A, B, C, D, E" is included in each of the data areas.

At time t2, a writing process is performed with respect to the main memory area 31, and the memory data "B, E" in the data area of the writing destination is rewritten to "Z, E". At this time, in a difference memory 1 as a predetermined storage area, the memory data "B, E" before the writing process into the data area of the write destination is saved in the difference memory data (3412-1, 3412-2). In the difference memory 1 (341), the leading address of the difference memory 1 (341) described with reference to FIG. 7 is saved.

Next, at time t3, the memory data "Z, C" before the writing process into the data area of the write destination, is saved as the difference memory data (3422-1, 3422-2) of the difference memory 2 (342) which has been changed from the difference memory 1 (341), and the main memory area 31 is rewritten to "G, F". At time t4, the memory data "G, D" before the writing process into the data area of the write destination, is saved as the difference memory data (3432-1, 3432-2) of the difference memory (343) which has been changed from the difference memory 2 (342), and the main memory area 31 is rewritten to "H, D".

In the state of time t4, for example, if the OS crashes and the CPU stops, the complete memory dump at time t4 and the information from the difference memory 1 (341) through the difference memory 3 (343) saved in the difference memory area 32, are saved. Furthermore, in each difference memory, memory change tables (3413, 3423, 3433) are saved.

Figure 9:
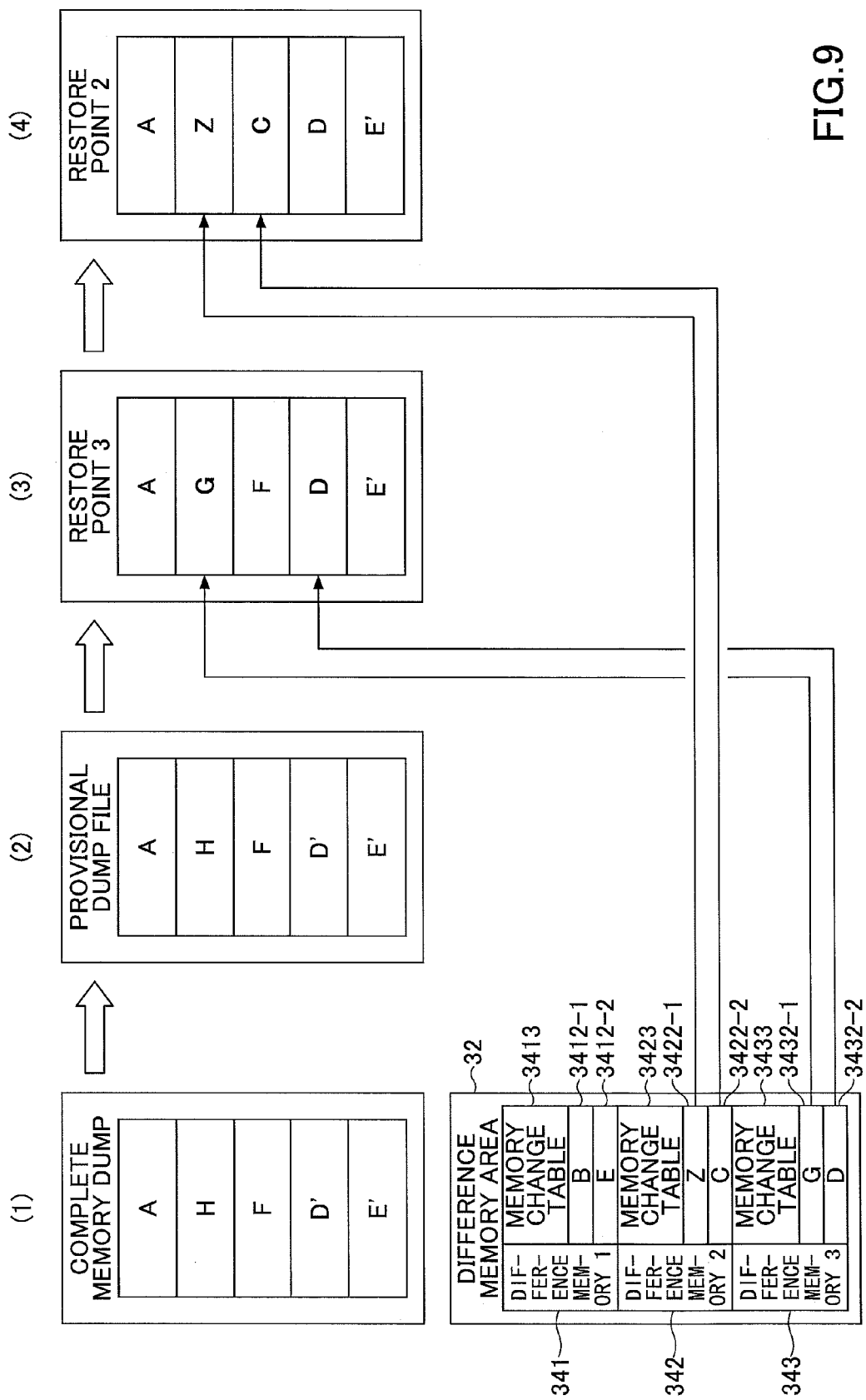
FIG. 9 illustrates restoring a memory dump.

Next, a detailed description is given of restoring a memory dump at each restore point, when analyzing the cause of the OS crash, with reference to FIG. 9. FIG. 9 illustrates an example of restoring a memory dump.

In FIG. 9, (1) indicates the complete memory dump that is saved at the time of the OS crash described with reference to FIG. 8, and the difference memory area 32.

In (2), first, the complete memory dump is read by rebooting the OS, and a provisional dump file is created. Creating and restoring a provisional dump file may be performed by, for example, another computer used for analyzing dump files.

In (3), the memory data "G, D" of the difference memory data (3432-1, 3432-2) of the difference memory 3 (343) that was saved last before the crash, is written into the original address according to the address in the main memory area 31 saved in the memory change table 3433, and the complete memory dump at restore point 3 is restored.

In (4), the memory data "Z, C" of the difference memory data (3422-1, 3422-2) of the difference memory 2 (342), is written into the original address according to the address in the main memory area 31 saved in the memory change table 3423, and the complete memory dump at restore point 2 is restored.

FIG. 9 illustrates the restoring of the complete memory dump up to restore point 2; however, by the same method, it is possible to restore past complete memory dumps based on the data of the difference memory that has been sequentially saved.

Therefore, when the crash of the OS has been caused by a past factor that is not immediately before the crash, it is possible to easily analyze the cause of the crash by restoring the memory dump at the respective restore points by tracing back to the past in time series.

Figure 10:
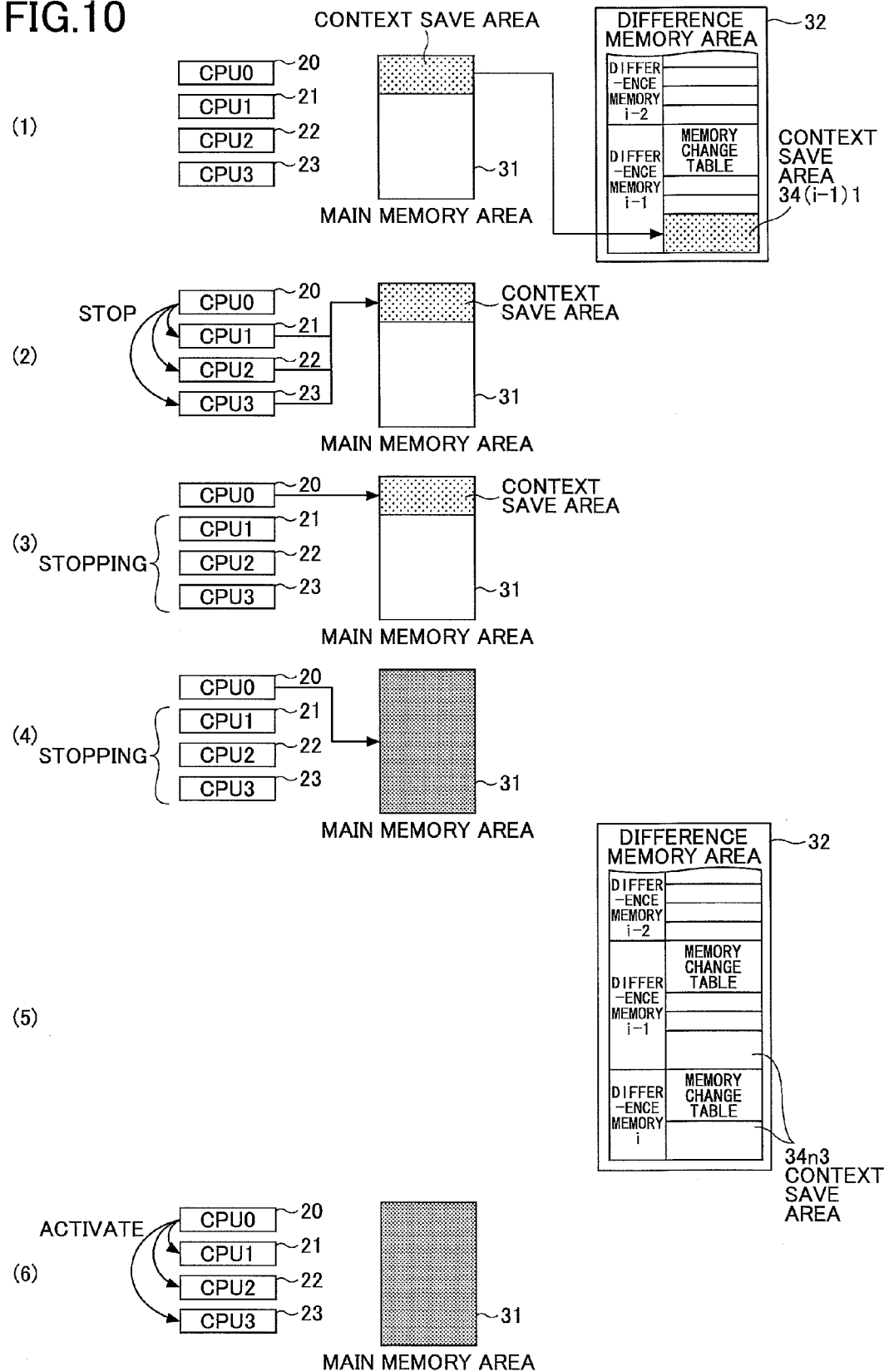
FIG. 10 illustrates the association between the difference memory and context information.

Next, a description is given, with reference to FIG. 10, of the matching of the memory data of the main memory area 31 according to the restore process 131 described with reference to FIG. 3, and the context information. FIG. 10 illustrates an example of the association between the difference memory and context information.

FIG. 10 illustrates an example where the memory management device 1 according to the present embodiment is a multiprocessor including four CPUs, CPU 0 (20) through CPU 3 (23). It is assumed that the restore process 131 is executed by the CPU 0.

In (1), when the restore process 131 is activated, when the memory data of the dump-use context save area (area indicated by halftone dots in FIG. 10) in the main memory area 31 is not saved by the context switch, a change is explicitly made to the context save area. By making a change, the detection unit 121 described with reference to FIG. 3 detects the writing into the main memory area 31, and saves the memory data in the context save area 34 (i−1) of the difference memory area (i−1) as a predetermined storage area. By the process illustrated in (1), it is possible to save the data of the memory in the data area that is the write destination that is saved in association with the context information. Furthermore, the saving of the context information is performed by the memory management program 12 described with reference to FIG. 7 or 8, and therefore the stop time of the system is further reduced compared to the case where the restore process 131 saves the context information.

In (2), the restore process 131 stops the CPU 1 (21) through CPU 3 (23) by performing a waiting process (loop process), and backs up the context information of the CPU 1 (21) through CPU 3 (23) in the dump-use context save area.

In (3), the restore process 131 backs up the context information of the CPU 0 in the dump-use context save area.

In (4), the restore process 131 sets the entire main memory area 31 to a write inhibit state, and traps writing processes to the main memory area 31. The writing processes to the main memory area 31 are trapped, and as described with reference to FIGS. 7 and 8, the data of the memory before writing into the data area of the write destination is saved in the difference memory area (i−1). The saved data of the memory is saved in association with the difference memory area (i−1) that is the same predetermined area as that of the context information saved in (1) and (2).

In (5), the restore process 131 secures a context save area 34i1 in the difference memory i, and changes the context save area to a context save area 34n3 in the difference memory 34. For example, when n=i, the context save area is changed to the context save area 34i3.

In (6), the restore process 131 activates the stopped CPU 1 (21) through CPU 3 (23) and resumes the processes, and ends the process of the restore process 131 itself.

By the above operations, even in the case of a multiprocessor, the context information and the difference memory data of all processors at the same timing are associated with each other, and saved so as to match each other. Furthermore, by saving the context information in the difference memory area 32, the context information is saved in association with the saving of the difference memory. Therefore, there is no need to save the context information by an interrupt process by the restore process 131, and the stop time of the system due to an interrupt process is reduced.

Figure 11:
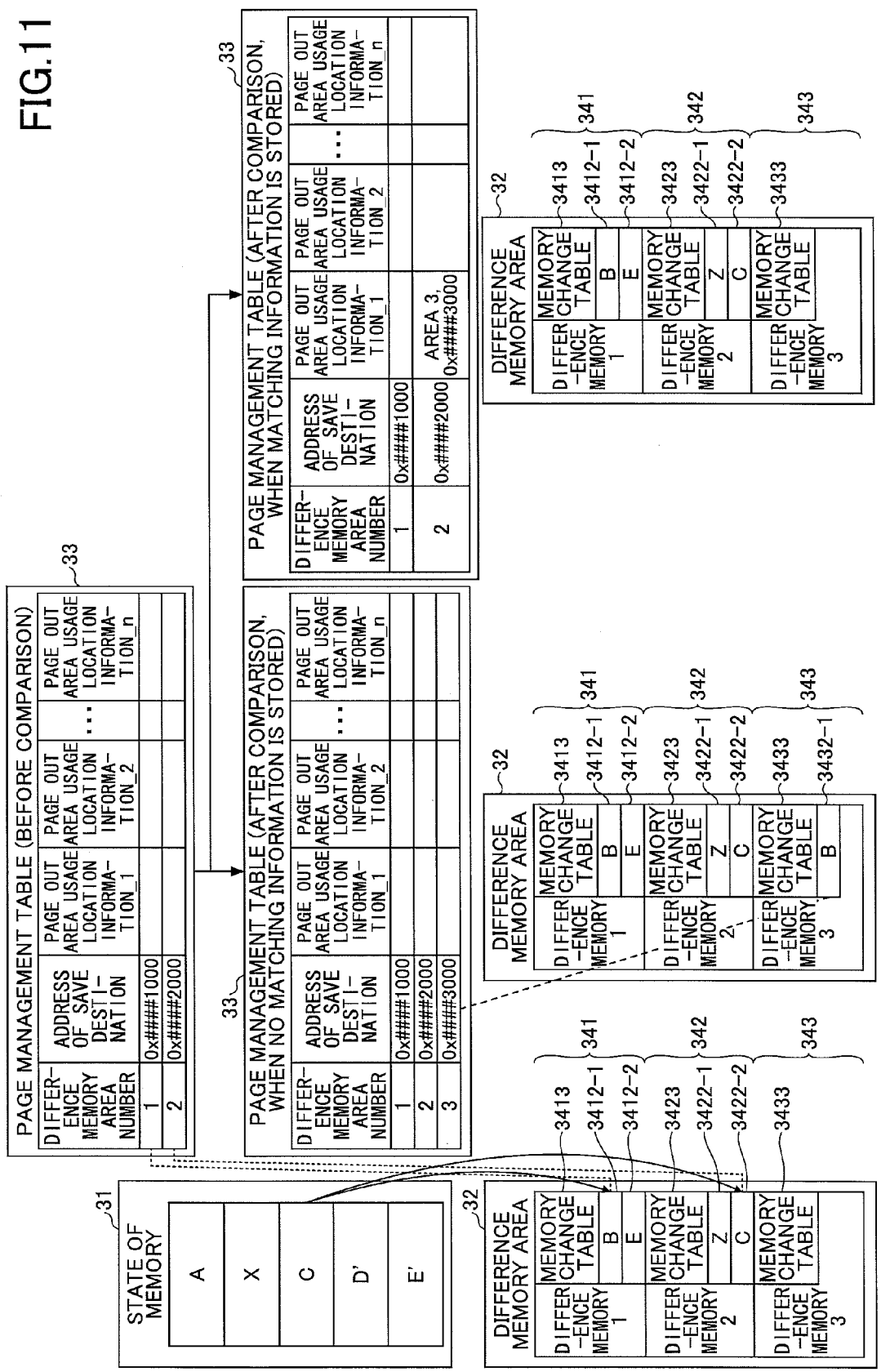
FIG. 11 illustrates saving the memory data when paging occurs.

Next, a description is given of saving the difference memory in consideration of a paging process, with reference to FIG. 11. FIG. 11 illustrates an example of saving the memory data when paging occurs.

In FIG. 11, when the detection unit 121 described with reference to FIG. 3 detects that a change is to be made in the memory area holding the memory data C of the main memory area 31 according to page out, the memory data C to be subjected to page out is compared with the memory data that has been saved in the difference memory in the past, based on information saved in the page management table 33 (FIG. 11 illustrates a case where the memory data C is already saved).

When there is no matching information stored, and the memory data C is not detected, the information C before being changed is saved in the difference memory 2, and the address ("0x####3000" in FIG. 11) of the save destination of the difference memory data of the difference memory 3 is newly registered in the page management table 33.

Meanwhile, when the detection unit 121 detects that memory data matching the memory data C is already stored in the difference memory area (3442-2), information is not saved in the difference memory area, and the information is added to the record of the matching information in the page management table 33 in the location where the information was originally supposed to be saved. FIG. 11 illustrates a case where "area 3, 0x####3000" is added to the page out area usage location information_1.

By the above operation, even in a case where the main memory area 31 is rewritten due to the occurrence of paging, it is possible to save the difference memory in the difference memory area 32.

Next, a description is given of an example of deleting the difference memory, with reference to FIGS. 12 and 13. FIG. 12 illustrates an example of setting a method of deleting the difference memory. FIG. 13 illustrates an example of deleting the difference memory.

The difference memory 34 sequentially saves memory data and context information not only when the OS crashes and stops but also when the OS is operating. Therefore, for example, there may be cases where the memory size of the difference memory area 32 becomes large. Thus, in the present embodiment, the difference memory 34 is deleted according to a predetermined condition, and data relevant to examining failures is retained without being deleted, such that the memory size of the difference memory area 32 is prevented from enlarging.

In FIG. 12, the method of deleting the difference memory 34 is set by setting items and parameters. For example, a setting may be made to delete memory data that has been saved for more than a certain amount of time from the present time and that has become old. When the system is stably operating, the memory data that has been saved for more than a certain amount of time and that has become old, is unlikely to be used for analyzing the cause of trouble. Thus, the data that has been recorded within a predetermined amount of time before the crash is retained without being deleted, and older data is deleted, such that the memory size of the difference memory dump is reduced.

Furthermore, a setting may be made to thin out the data by deleting the difference memory 34 by every several data items. For example, the temporal granularity level of saving the difference memory may be changed, according to when the system is operating in a stable manner and when the system is operating in an unstable manner.

Furthermore, a setting may be made to delete data except for the difference memory 34, when the context information of the CPU includes a particular instruction or a particular address. Accordingly, it is possible to intensify the monitoring with respect to the handling of instructions and data that are highly likely to cause trouble.

Note that in the setting of deleting the difference memory 34 described with reference to FIG. 12, a plurality of setting items may be simultaneously set. The setting items may be set with a UI provided by the memory management program 12.

In FIG. 13, it is assumed that there are difference memories 1 through 5 before deletion. Among these, the difference memory 2 (342) and the difference memory 4 (344) are deleted. The memory data "Z, C" included in the difference memory 2 (342) that is the target of deletion, is saved in the difference memory 1 (341) that has been saved immediately before the difference memory 2 (342).

Note that when the difference memory that is the target of deletion is a memory area saved according to page out, the description of the address of the save destination of the difference memory data of the difference memory recorded in the page management table 33 is also changed.

Next, the memory data "U" included in the difference memory 4 (344) that is the target of deletion is saved in the difference memory 3 (343) saved immediately before the difference memory 4 (344). Meanwhile, as for the memory data "D'" included in the difference memory 4 (344), because there is memory data "D" included in the same area in the difference memory 3, the memory data "D'" is not used at the time of restoring and is thus not saved.

Next, the difference memory 2 (342) and the difference memory 4 (344) are deleted and the deleting process ends.

Next, the operations of the memory management device 1 described above is described with reference to flowcharts.

First, the operation of the memory management program 12 is described with reference to FIG. 14. FIG. 14 is a flowchart of an example of a memory management operation.

In FIG. 14, the detection unit 121 of the memory management program 12 starts monitoring the main memory area 31, as a mechanism of memory difference monitoring (step S11). Note that details of the operation of step S11 are described below with reference to FIG. 15.

Next, the memory management program 12 determines whether a request to acquire a restore point has been received (step S12). When a request to acquire a restore point has been received (YES in step S12), the memory management program 12 creates a dump restore point (step S13). When a request to acquire a restore point has not been received (NO in step S12), step S12 is looped. Note that details creating a dump restore point of step S13 are described below with reference to FIG. 16.

The memory management program 12 is a resident program while the memory management device 1 is operating, and performs steps S12 and S13 by looping.

Figure 15:
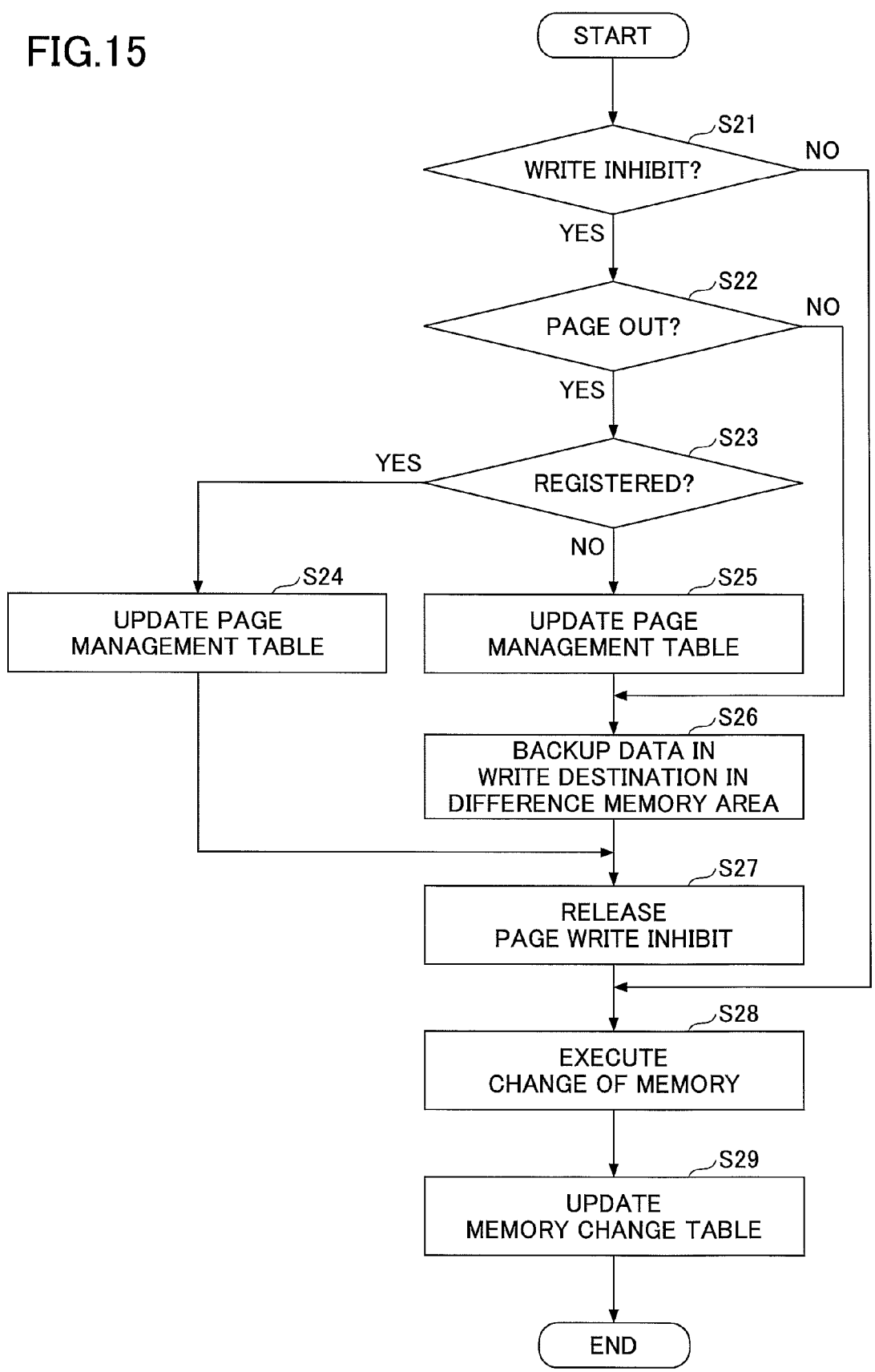
FIG. 15 is a flowchart of acquiring memory data.

Next, with reference to FIG. 15, a detailed description is given of the operation of acquiring memory data by page out, described with reference to FIG. 11. FIG. 15 is a flowchart of an example of acquiring memory data.

In FIG. 15, it is determined whether the main memory area 31 is in a write inhibit state (step S21). When the main memory area 31 is in a write inhibit state, the detection unit 121 traps the writing process in the main memory area 31. When the main memory area 31 is not in a write inhibit state (NO in step S21), the memory change of the main memory area 31 is executed (step S28), the memory change table 34n3 is updated (step S29), and the process ends.

On the other hand, when the main memory area 31 is in a write inhibit state (YES in step S21), it is determined whether page out has occurred (step S22). When page out has occurred (YES in step S22), it is determined whether the memory data in the main memory area 31 before the change has been registered (step S23). When the memory data has been registered (YES in step S23), the page out area usage location information in the page management table 33 described with reference to FIG. 11 is updated (step S24).

When the memory data has not been registered (NO in step S23), an update is performed by adding a new difference memory area to the information of the address of the save destination in the page management table 33 (step S25), and the data of the data area of the write destination is saved and backed up in the added difference memory area (step S26). Furthermore, when page out has not occurred (NO in step S22), similarly, the data in the data area of the write destination is saved in the difference memory area (step S26).

Next, the page write inhibit state is released (step S27), and a memory change is executed (step S28).

By the above operations, the data written into the main memory area 31 is saved as a difference memory.

Figure 16:
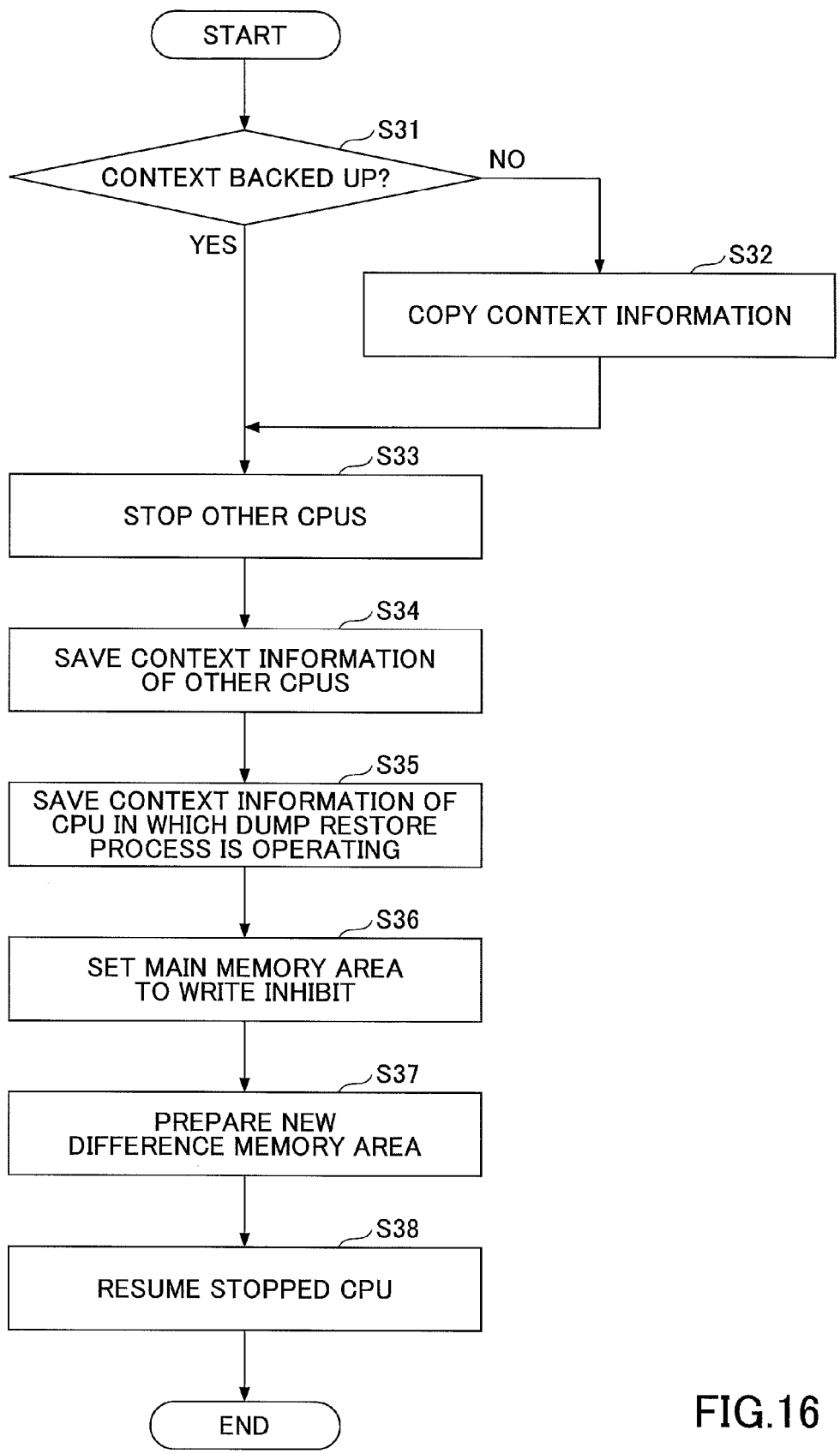
FIG. 16 is a flowchart of creating a memory dump restore point.

Next, with reference to FIG. 16, a detailed description is given of the operation of creating a memory dump restore point described with reference to FIG. 10. FIG. 16 is a flowchart of an example of creating a memory dump restore point.

In FIG. 16, it is determined whether the context information of the main memory area 31 has been backed up (step S31). When the context information has been backed up (YES in step S31), other CPUs are stopped (step S33). On the other hand, when the context information has not been saved (NO in step S31), the context information is saved in the context information save area of the difference memory (step S32), and the other CPUs are stopped (step S33). The context information of the stopped CPUs is saved in the main memory area 31 (step S34), and next, the context information of the CPU 0 in which the restore process 131 is operating, is saved in the main memory area 31 (step S35).

The main memory area 31 is set to a write inhibit state (step S36), a new difference memory area is prepared in the difference memory area 32 (step S37), the operation of the stopped CPUs is resumed (step S38), and the operation of creating the memory dump restore point is ended.

Next, with reference to FIG. 17, a detailed description is given of the operation of restoring a memory dump described with reference to FIG. 9. FIG. 17 is a flowchart of an example of restoring a memory dump.

In FIG. 17, as a provisional dump file, the complete memory dump is copied (step S41).

Next, steps S42 through S45 are repeated until the memory dump of the target restore point is reached. First, based on information of the memory change table of the difference memory with respect to each restore point, the provisional dump file is rewritten by the memory data of the difference memory, and the memory dump at each restore point is restored (step S43).

Meanwhile, when there is no information corresponding to the difference memory, based on the information of the page out area usage location information saved in the page management table 33, the memory data is read and the provisional dump file is rewritten, and the memory dump is restored (step S44).

The memory dumps are restored up to the target restore point, and the operation of restoring a memory dump is ended.

As described above, by the operation according to the present embodiment, even before the CPU stops due to an OS crash, the difference memory data and the associated context information are saved so as to match each other, and therefore it is possible to restore the state of the CPU 2 and the memory dump in the past before the CPU stops due to an error, in addition to the complete memory dump when the CPU stops due to an error. Therefore, the cause of the trouble is easily analyzed.

The present invention is not limited to the specific embodiments described herein, and variations and modifications may be made without departing from the scope of the present invention.

According to an aspect of the embodiments, when a device stops due to a failure, it is possible to reduce the time of the process of acquiring context information.

The present invention is not limited to the specific embodiments described herein, and variations and modifications may be made without departing from the scope of the present invention. Furthermore, all of or some of the elements in the above embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a processor to execute a process comprising:
   detecting writing into a first memory area;
   saving, in association with each other in a second memory area other than the first memory area, data before the writing which is stored in a data area at a write destination of the detected writing into the first memory area, and context information of the processor at a time of detecting the writing into the first memory area;
   changing the second memory area when saving the context information; and
   making an explicit change to a context save area of the first memory area when the context information is not saved according to a context switch, such that the writing into the first memory area is detected and the context information is saved in a context save area of the second memory area,
   the saving sequentially saves the data before the writing, in association with the changed second memory area, to perform a memory dump,
   the context information indicates a usage status of the processor, and is saved when the processor is shared by a plurality of processes and a context switch occurs, and
   the data saved in the second memory area is saved together with corresponding context information, such that the data at a point in time before the processor stops due to an error is consistent with a state of the processor at the same point in time.

2. The non-transitory computer-readable recording medium according to claim 1, wherein the changing of the second memory area is performed at a timing which is set in advance.

3. The non-transitory computer-readable recording medium according to claim 1, wherein the saving of the context information includes saving the context information of a plurality of processors.

4. A memory management method comprising:
   detecting writing into a first memory area;
   saving, in association with each other in a second memory area other than the first memory area, data before the writing which is stored in a data area at a write destination of the detected writing into the first memory area, and context information of a processor at a time of detecting the writing into the first memory area;
   changing the second memory area when saving the context information; and
   making an explicit change to a context save area of the first memory area when the context information is not saved according to a context switch, such that the writing into the first memory area is detected and the context information is saved in a context save area of the second memory area,
   the saving sequentially saves the data before the writing, in association with the changed second memory area, to perform a memory dump,
   the context information indicates a usage status of the processor, and is saved when the processor is shared by a plurality of processes and a context switch occurs, and
   the data saved in the second memory area is saved together with corresponding context information, such that the data at a point in time before the processor stops due to an error is consistent with a state of the processor at the same point in time.

5. The memory management method according to claim 4, wherein the changing of the second memory area is performed at a timing which is set in advance.

6. The memory management method according to claim 4, wherein the saving of the context information includes saving the context information of a plurality of processors.

7. A non-transitory computer-readable recording medium having stored therein a program for causing a processor to execute a process comprising:
   detecting writing into a first memory area;
   saving, in association with each other in a second memory area other than the first memory area, data before the writing which is stored in a data area at a write destination of the detected writing into the first memory area, and context information of the processor at a time of detecting the writing into the first memory area;
   changing the second memory area when saving the context information; and
   making an explicit change to a context save area of the first memory area when the context information is not saved according to a context switch, such that the writing into the first memory area is detected and the context information is saved in a context save area of the second memory area,
   the saving sequentially saves the data before the writing, in association with the changed second memory area, to perform a memory dump,
   the context information indicates a usage status of the processor, and is saved when the processor is shared by a plurality of processes and a context switch occurs,
   the data saved in the second memory area is saved together with corresponding context information, such that the data at a point in time before the processor stops due to an error is consistent with a state of the processor at the same point in time,
   the second memory area includes a first table for managing a change in the data at a time of a page out, and difference memories respectively configured to store the context information, the data before the writing to be saved, and a second table,
   the second table includes an address of a memory area, a change flag, and the address of a save destination, the address of the memory area indicates a leading
   address when the first memory area is divided into units
   of pages,
the change flag indicates whether a change is made in the
   first memory area, and
the address of the save destination is the leading address
   of each difference memory area, and is also recorded in
   association with the address of the memory area with
   respect to the difference memories that increase or
   decrease in number.

8. The non-transitory computer-readable recording medium according to claim 7, wherein the data of at least one of the difference memories is written into an original address according to the address in the first memory area saved in the memory change table, to restore the memory dump.

9. A memory management method comprising:
detecting writing into a first memory area;
saving, in association with each other in a second memory area other than the first memory area, data before the writing which is stored in a data area at a write destination of the detected writing into the first memory area, and context information of a processor at a time of detecting the writing into the first memory area;
changing the second memory area when saving the context information; and
making an explicit change to a context save area of the first memory area when the context information is not saved according to a context switch, such that the writing into the first memory area is detected and the context information is saved in a context save area of the second memory area,
the saving sequentially saves the data before the writing, in association with the changed second memory area, to perform a memory dump,
the context information indicates a usage status of the processor, and is saved when the processor is shared by a plurality of processes and a context switch occurs,
the data saved in the second memory area is saved together with corresponding context information, such that the data at a point in time before the processor stops due to an error is consistent with a state of the processor at the same point in time,
the second memory area includes a first table for managing a change in the data at a time of a page out, and difference memories respectively configured to store the context information, the data before the writing to be saved, and a second table,
the second table includes an address of a memory area, a change flag, and the address of a save destination,
the address of the memory area indicates a leading address when the first memory area is divided into units of pages,
the change flag indicates whether a change has been made in the first memory area, and
the address of the save destination is the leading address of each difference memory area, and is also recorded in association with the address of the memory area with respect to the difference memories that increase or decrease in number.

10. The memory management method according to claim 9, wherein the data of at least one of the difference memories is written into an original address according to the address in the first memory area saved in the memory change table, to restore the memory dump.

11. A non-transitory computer-readable recording medium having stored therein a program for causing a multiprocessor to execute a process comprising:
detecting writing into a first memory area;
saving, in association with each other in a second memory area other than the first memory area, data before the writing which is stored in a data area at a write destination of the detected writing into the first memory area, and context information of a plurality of processors of the multiprocessor at a time of detecting the writing into the first memory area;
changing the second memory area when saving the context information;
stopping the plurality of processors of the multiprocessor by performing a waiting process, to back up the context information of the plurality of processors in a context save area of the first memory area;
making an explicit change to the context save area of the first memory area when the context information is not saved according to a context switch, such that the writing into the first memory area is detected and the context information is saved in a context save area of the second memory area; and
performing a restore process by setting the first memory area to a write inhibit state and activating the plurality of stopped processors to resume processes,
the saving sequentially saves the data before the writing, in association with the changed second memory area, to perform a memory dump,
the context information indicates a usage status of the plurality of processors of the multiprocessor and is saved when one of the plurality of processors is shared by a plurality of processes and the context switch occurs, and
the data saved in the second memory area is saved together with corresponding context information, such that the data at a point in time before the multiprocessor stops due to an error is consistent with a state of the multiprocessor at the same point in time.

12. The non-transitory computer-readable recording medium according to claim 11, wherein the second memory area includes a table for managing a change in the data at a time of a page out.

13. The non-transitory computer-readable recording medium according to claim 12, wherein
the second memory area further includes difference memories respectively configured to store the context information, the data before the writing to be saved, and a memory change table,
the memory change table includes an address of a memory area, a change flag, and the address of a save destination,
the address of the memory area indicates a leading address when the first memory area is divided into units of pages,
the change flag indicates whether a change is made in the first memory area, and
the address of the save destination is the leading address of each difference memory area, and is also recorded in association with the address of the memory area with respect to the difference memories that increase or decrease in number.

14. The non-transitory computer-readable recording medium according to claim 13, wherein the data of at least one of the difference memories is written into an original address according to the address in the first memory area saved in the memory change table, to restore the memory dump.

\* \* \* \* \*